United States Patent [19]
Ponroy

[11] Patent Number: 5,869,530
[45] Date of Patent: Feb. 9, 1999

[54] DIETETIC PHOSPHOLIPID COMPOSITIONS AND USE THEREOF AS A DIETARY SUPPLEMENT

[75] Inventor: Yves Ponroy, Versailles, France

[73] Assignee: Institut de Recherche Biologique, France

[21] Appl. No.: 617,805

[22] PCT Filed: Jun. 12, 1995

[86] PCT No.: PCT/FR95/00770

§ 371 Date: Feb. 27, 1996

§ 102(e) Date: Feb. 27, 1996

[87] PCT Pub. No.: WO96/00016

PCT Pub. Date: Jan. 4, 1996

[30] Foreign Application Priority Data

Jun. 27, 1994 [FR] France .................................. 94/07868

[51] Int. Cl.$^6$ .................................. A61K 31/185
[52] U.S. Cl. .................. 514/560; 514/549; 514/552; 514/558
[58] Field of Search .................. 514/504, 558, 514/549, 552

[56] References Cited

U.S. PATENT DOCUMENTS

| | | | |
|---|---|---|---|
| 4,918,104 | 4/1990 | Weiss et al. | 514/560 |
| 5,012,761 | 5/1991 | Oh | 119/6.8 |
| 5,089,268 | 2/1992 | Katz | 424/450 |
| 5,626,891 | 5/1997 | Aii | 514/558 |

FOREIGN PATENT DOCUMENTS

| | | |
|---|---|---|
| 327765 | 8/1989 | European Pat. Off. . |
| 404058 | 12/1990 | European Pat. Off. . |
| 474266 | 5/1992 | European Pat. Off. . |

OTHER PUBLICATIONS

Foreman, Am. J. Nutr., vol. 57, p. 829s, 1993.
Peirano, J. Pediatr., vol. 120, pp. 168–180, 1992.
Bourre(l), Prostaglandins, Leukotrienes and Essential fatty acids, vol. 48, pp. 5–15, 1993.
Bourre(ll), J. Neuroch, vol. 60, pp. 2018–2087, 1992.
Jiang et al, Chem Abst., vol. 116, #234456 (1992).
Hargis et al, Medline #91343525 (1991).
Hargis, Derwent #85-17,5488 (1985).

*Primary Examiner*—James H. Reamer
*Attorney, Agent, or Firm*—Bierman, Muserlian and Lucas

[57] ABSTRACT

Novel dietetic compositions providing essential fatty acids from series n-3 and n-6 and containing phospholipids rich in polyunsaturated fatty acids having a very long chain and being present in egg yolks from hens given feed enriched with essential fatty acids from series n-3 and n-6, combined or mixed with food-grade carriers or diluents. Said compositions are useful as dietary supplements for infants, toddlers and the elderly.

8 Claims, No Drawings

DIETETIC PHOSPHOLIPID COMPOSITIONS AND USE THEREOF AS A DIETARY SUPPLEMENT

This application is a 371 of PCT/FR95/00770 Jun. 12, 1995.

The present invention relates to the domain of dietetic and more particularly to the domain of nutritional supplements.

More particularly the present invention has as a subject matter novel dietetic compositions intended to compensate in the new-born babies, and the children or in the old people, a nutritional deficit in essentials fatty acids belonging to the series n-3 and n-6.

Specifically it has as a subject matter, the dietetic compositions providing essentials fatty acids from series n-3 and/or n-6 in weak patients, in misnutritioned or deprived subjects, in an easily usable and directly useful form for the well-being of the subjects.

It is effectively known that:
the premature babies and low weight babies at the birth, have particular needs which are not satisfied with the existing artificial milks, even if they contain a sufficient quantity of linoleic (18:2 n-6) and α-linolenic (18:3 n-3) acids. In effect, the enzymatic equipment (desaturases and elongases) of premature babies is to limited, to synthesize the higher homologous and particularly docosahexanoïc acid or DHA (22:6 n-3), and arachidonic acid (20:4 n-6) (M. FOREMAN Am. J. Clin. Nutr. 57 (suppl) (1993) 829S).

a loading in these fatty acids seems then primordial to ensure a correct development of the vision (P. PEIRANO J. Pediatr. 120 (1992) 168–180), but also of the other cerebral functions in the premature babies which are not suckled. Tests have shown that the photoreceptive functions of the premature babies have an optimal maturation only, if a sufficient supply of polyunsaturated long chain fatty acids of the series n-3 is achieved, either with mother's milk, either with presscake of fish oils (D. R HOFFMAN Am. J. Clin. Nutr. 57 (suppl) (1993) 801–806).

It has even been evidenced a relationship between the level of DHA in the plasma of the newborn babies and their degree of prematurity evaluated according to indexes of psychomotor and mental development (K. BJERVE Am. J. Clin. Nutr. 57 (suppl) (1993) 801–806)

Various sources of DHA have been suggested, starting from press-cake of fish oil but this has the disadvantage to contain a high percentage of eicosapentaenoic acid or EPA (20:5 n-3) the presence of which may be noxious in babies and which is not normally found in mother's milk (K. BJERVE)

The essentials fatty acids, and in particular α-linolenic acid (18:3 n-3) have a fundamental role for the child cerebral maturation but deficiencies are frequent. A deficiency in essentials fatty acids in serie n-3, generates a diminution in DHA amount at the cerebral level (22:6 n-3). After a supply of α-linolenic acid, recovery is extremely slow (J. M BOURRE Prostaglandins, Leukotrienes and Essential fatty acids, 48 (1993) 5–15), whereas a supply into higher fatty acids and in particular into DHA, promotes a rapid recovery (J. M BOURRE J. Neuroch. 60 (1992) 2018–2027).

In a same way, at the time of ageing, the desaturation and elongation capacities for essential fatty acids are reduced. Thus, it may be contemplated beneficial effects of a supply into polyunsaturated long chain fatty acids.

The present invention consist to propose an origin of fatty acids to the n-3 serie in a proportion suitable for the nervous system and in particular rich in DHA (22:6 n-3) and in arachidonic acid (20:4 n-6) in the form of phospholipids which are rich in fatty acids belonging to the n-3 serie.

This phospholipids rich in very long chain polyunsaturated fatty acids are present particularly in egg yolk from hens which have been appropriately fed, in particular with food enriched with essential fatty acids from series n-3 and n-6, such as α-linolenic acid and linoleic acid: seeds or colza oil, soya oil, linseed oil, Ribes's fruits oil.

The phospholipids of egg yolk from hens have the following chemical structure:

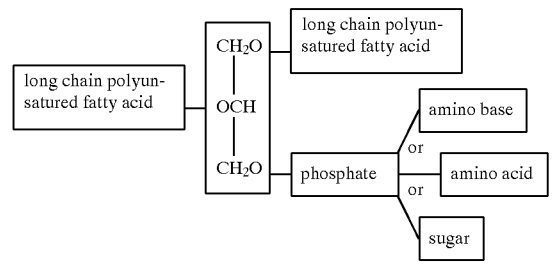

the fatty acids are bound with the glycerol, either with an ester link, either with an ether link.

The present invention has, as a consequence thereof, as a subject, dietary compositions based on a mixture of phospholipids extracted from eggs from hens given feed enriched with vegetable oil rich in polyunsaturated ethyl fatty acids of the serie n-3, such as for example, colza oil, linseed oil or soya oil or even enriched with the seeds of said plants which bring the same supplementation, in association or admixture with an appropriate carrier or diluent, to allow its adjunction to the food.

As a result, these phospholipids contain in physiological proportion, the following constituents:

| | |
|---|---|
| phosphatidylcholine | 75–80% |
| phosphatidylserine | lower than 0.5% |
| phosphatidylinositol | 0.5–1% |
| phosphatidylethanolamine | 15–20% |
| plasmalogen | 1–2% |
| sphingomyelin | 2–3% |

This phospholipids have this in particular and specifically that they are composed of a notable amount of polyunsaturated fatty acids having a long chain such as:

| | | |
|---|---|---|
| arachidonic acid | 20:4 n-6 | from 2 to 6% |
| DHA | 22:6 n-3 | from 3 to 6% |
| the ratio $\frac{n-6}{n-3}$ | | lower than 4 |
| the ratio $\frac{\text{arachidonic acid}}{\text{DHA}}$ | | between 0.5 and 1.5 |
| the ratio $\frac{\text{EPA}}{\text{DHA}}$ | | lower than 0.25 | a publication has already shown the difference of composition in fatty acids between eggs from hens issued from a traditional farm in Greece and an industrial breeding and sold by the tall distribution in the USA. (A. P SIMOPOULOS N. Engl. J. of Med. 1989 (16 Nov., 1989)p. 1412).

| Acid: | | farmer Greek eggs | industrial eggs of the US |
|---|---|---|---|
| | | (in fatty acids per gramm, in mg) | |
| linoleic | 18:2 n-6 | 16 | 26 |
| α-linolenic | 18:3 n-3 | 6.90 | 0.52 |
| arachidonic | 20:4 n-6 | 5.4 | 5.02 |
| EPA | 20:5 n-3 | 1.2 | — |
| | 22:5 n-3 | 2.8 | 0.09 |
| DHA | 22:6 n-3 | 6.6 | 1.09 |
| ratio $\frac{n-6}{n-3}$ | | 1.3 | 19.4 |
| ratio $\frac{arachidonic\ acid}{DHA}$ | | 0.82 | 4.61 |
| ratio $\frac{EPA}{DHA}$ | | 0.18 | — |

Other works have confirmed the variability in the composition in fatty acids present in egg yolk from fowls, as a function of their feeding For example, the high content in fatty acids of the n-3 serie in the eggs from Greek farm in general is due from the feeding of the hens principally constituted of purslane which is known for its high content in fatty acids n-3 (A. P SIMOPOULOS N. Engl. J. of Med. 315 (1986) (13) 833).

Other authors have confirmed that eggs from hens of industrial breeding contained very low amounts of fatty acids of the n-3 serie and only traces of DHA. The same authors have proposed to enrich the animal's ration in fish oil in order to enrich the eggs in fatty acids of the n-3 serie to improve the dietary properties. But, fish oil increase the amount of EPA (C20:5 n-3) present in egg yolk phospholipids and this is not desirable in the children and particularly in the new-born babies.

As an example, it is possible to compare the content in polyunsaturated long chain fatty acids of eggs from hens controls receiving an industrial classical food and hens receiving the same food to which one has mixed 10% of a vegetable oil which is known for its high content in α-linolenic acid (C 18:3 n-3), and particularly the linseed or colza oil.

| | fatty acids of eggs from hens in percentage of the total of fatty acids | |
|---|---|---|
| | controls regimen | regimen vegetable oil rich in n-3 serie |
| 18:2 n-6 | 8.8 | 10.6 |
| 18:3 n-3 | 0.2 | 5.5 |
| 20:4 n-6 | 1.8 | 2.0 |
| 20:5 n-3 | 0 | 0.2 |
| 22:6 n-3 | 0.8 | 3.9 |
| Sum n-3 | 1.3 | 7.9 |
| Sum n-6 | 10.7 | 11.4 |
| Ratio $\frac{n-6}{n-3}$ | 8.2 | 1.4 |

The nutritional use of phospholipids egg yolk from hens has already been considered, particularly for fighting against senescence disorders (N. HUBER Phospholipids (1990) 241–253), but in these works it has been almost told of a supply in phosphatidylcholin regardless of the nature of fatty acids, the supply of which cause a fluidisation of the membrane and activate the lymphocytes and the macrophages.

In these publications, it has not been contemplated to enrich the hen's alimentary ration with fatty acids of the n-3 serie; also it has not been foreseen to exercise a regeneration and building action of the neuronal membranes.

This nutritional supply of phospholipids from eggs rich in polyunsaturated long-chain fatty acids is justified more particularly in the following cases:

in the premature babies and fragile new-born babies which are known as unable to realize the biosynthesis of this specific fatty acids which are indispensable for the central nervous system.

in the children or adolescents which may have school delay or difficulties following delay in the cerebral maturation caused by a deficiency in essentials fatty acids.

in the elderly for fighting against the cerebral ageing and promoting the physiological regeneration of membrans.

The egg's phospholipids, rich in polyunsaturated long chain fatty acids, can be utilized in the infant milks or as a nutritional complement, mixed or not mixed to other nutritional elements such as vitamins, mineral salts or oligo elements and be presented in the form of a powder, tablets, soft gelatin capsules or capsules to be crunched or to be swallowed.

The phospholipids according to the invention will be, for these purposes, admixed with or diluted by alimentary adjuvants such as flours, sugars, polyols, saccharides, diluents, with sweetening agents, binding agents, flavouring agents, taste agents.

As alimentary adjuvants, it may be cited the flour of cereals, oilcakes of oleaginous plants, autolysates of protein, autolysates of barm, peptones, casein, pectins, gelatins or hydrolysates of gelatin.

Sugars which can be incorporated in the compositions according to the invention, are digestible sugars as saccharose, fructose, maltose or lactose or undigestible sugars as glucose and arabinose. It may also be added dextrins, modified, oxidized or hydrolysed starches, hydrolysed dextrins, maltodextrins or modified undigestible polysaccharides.

As diluents, it may be cited celluloses, modified celluloses, clays, mineral salts, undigestible proteins, proteins hydrolysates such as for example casein hydrolysates, or oil-deprived and deodorized fish flours.

As a binding agent, it may be cited at first alkylated celluloses, crosslinked or not crosslinked carboxymethyl celluloses, carboxymethyl starch or polymers of crosslinked vinyl pyrrolidon.

The content in egg phospholipids change according to the alimentary purpose. It will be higher for the preparation intended to children or adolescents. For the new-born babies and very young children, it will be lower, taking account of the fact that the nutritional supply at this age of the life, is a function of the body weight.

For old people, the supply in egg phospholipids will be more important because there is a nutritional deficit to compensate and a decrease in the enzymatic activity which tends to induce a loss of the essentials biological elements of construction.

The phospholipids according to the invention are prepared in the following way:

the eggs of hens, especially fed, are broken, yolks are separated and treated with acetone. Thus it is obtained a powdery product which is dried then extracted with a mixture of chlorinated solvent and alcohol. A concentrated solution of phospholipids is thus collected which is precipitated by adding a ketone. The part which contains phospholipids is dried and ground.

The oleaginous materials rich in polyunsaturated fatty acids of the n-3 serie are principaly seeds or oils of Ribes, colza or linseed.

EXAMPLE I

Powder to be incorporated to the milk of the baby's bottle

| | |
|---|---|
| Phospholipids of egg yolk from hens fed with a food which contain 10% of linseeds | 49,975 g |
| Milk casein | 100,000 g |
| Tocopherol acetate | 0,025 g |
| Calcium carbonate | 100,000 g | for 1000 sachets of powder containing 0,05 g of phospholipids of egg yolk to be incorporated to the milk of the baby's bottle or to be diluted in a little sugared water.

EXAMPLE II

| | |
|---|---|
| Phospholipids of egg yolk from hens fed with a food containing 5% of oil of blackcurrant seeds | 2,000 g |
| Soya lecithin | 1,000 g |
| Palmityl-6-L-ascorbic acid | 0,030 g |
| Sodium alginate | 1,000 g |
| Water ad | 100 ml |

Thus a milky emulsion is realized which may be incorporated to the milk of the baby's bottle or to be diluted in mineral water.

EXAMPLE III

| | |
|---|---|
| Phospholipids of egg yolk from hens fed with a standard food containing 10% of colza oil | 1,000 g |
| Microcrystalline cellulose | 10,000 g |
| Magnesium carbonate | 2,000 g |
| Tricalcium phosphate | 2,000 g |
| Vitamin E | 0,010 g |
| Methyl cellulose | 10,000 g |
| Coffe aroma | 1,000 g |
| Sorbitol | 25,000 g |
| Maltodextrin ad | 100 g |

Thus granulates are prepared which contain lecithins to be taken at each meal.

EXAMPLE IV

| | |
|---|---|
| Phospholipids of egg yolk from hens fed with a standard food supplemented with ground blackcurrant seeds | 1,000 g |
| Skimmed milk powder | 40,000 g |
| Tricalcium phosphate | 2,000 g |
| Ferrous gluconate | 0,400 g |
| Manganese carbonate | 0,100 g |
| Zinc lactate | 0,200 g |
| Microcristalline cellulose | 10,000 g |
| Sorbitol | 36,300 g |
| Lemon juice dried | 10,000 g |

The thus obtained powder is divided into sachets of 10 g. They are intended to be added at the feeding at each meal or to be diluted in a little water.

EXAMPLE V

| | |
|---|---|
| Phospholipids of egg yolk from hens fed with a standard food supplemented with 10% of linseeds | 25,00 g |
| Acerola powder | 20,00 g |
| Casein | 25,00 g |
| Calcium carbonate | 10,00 g |
| Magnesium stearate | 2,00 g |
| Fructose | 17,00 g |
| Mandarin aroma | 1,00 g | to make tablets, weighing in average 0,300 g each.

I claim:

1. A method of providing essential fatty acids of the n-3 and n-6 series to humans selected from the group consisting of premature babies, new born babies unable to biosynthesize said fatty acids and children and adolescents having a delay in central maturation due to a deficiency of said fatty acids comprising administering to said humans an amount of at least one phospholipid rich in polyunsaturated very long-chain fatty acids derived from egg yokes from chickens orally fed a chicken feed enriched in essential fatty acids of the n-3 and n-6 series sufficient to provide said fatty acids.

2. The method of claim 1 wherein the phospholipids are phospholecithins of chicken egg yokes containing as the major part phosphatidylcholine and phosphatidylethanolamine.

3. The method of claim 1 wherein the phospholipids of the chicken egg yokes contain as the major fatty acid component arachidonic acid (n-6) and docosahexenoic acid (n-3).

4. The method of claim 1 wherein the phospholipids have a ratio $$\frac{n-6}{n-3},$$

less than 4.

5. The method of claim 1 wherein the phospholipid concentration is 5 to 0.05 g per unit dosage.

6. The method of claim 1 wherein the concentration of the phospholipids is between 0.5 and 0.1 per unit dosage.

7. The method of claim 1 also containing at least one member of the group consisting of alimentary auxiliary substances, sweetening agents, binding agents, taste agents and flavoring agents.

8. The method of claim 1 in the form selected from the group consisting of tablets, soft gelatine capsules, capsules, powders and emulsions.

* * * * *